US012576822B2

(12) United States Patent
Witte

(10) Patent No.: US 12,576,822 B2
(45) Date of Patent: Mar. 17, 2026

(54) SYSTEM FOR CONTROLLING AN ELECTRIC PARKING BRAKE BY PULSE WIDTH MODULATION

(71) Applicant: FOUNDATION BRAKES FRANCE, Drancy (FR)

(72) Inventor: Lennart Witte, Strasbourg (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 356 days.

(21) Appl. No.: 16/762,049

(22) PCT Filed: Nov. 8, 2018

(86) PCT No.: PCT/FR2018/052773
§ 371 (c)(1),
(2) Date: May 6, 2020

(87) PCT Pub. No.: WO2019/092374
PCT Pub. Date: May 16, 2019

(65) Prior Publication Data
US 2020/0269824 A1 Aug. 27, 2020

(30) Foreign Application Priority Data
Nov. 9, 2017 (FR) ...................................... 1760528

(51) Int. Cl.
B60T 8/32 (2006.01)
B60T 1/06 (2006.01)
(Continued)

(52) U.S. Cl.
CPC ............ B60T 8/3295 (2013.01); B60T 1/065 (2013.01); B60T 8/172 (2013.01); B60T 13/746 (2013.01); B60T 2270/406 (2013.01)

(58) Field of Classification Search
CPC ........ B60T 8/3295; B60T 8/172; B60T 1/065; B60T 13/746; B60T 7/08; B60T 13/741; B60T 13/662; H02P 7/28
See application file for complete search history.

(56) References Cited

U.S. PATENT DOCUMENTS 6,652,039 B1 * 11/2003 Shull ........................ B60T 8/404
303/113.5
10,442,413 B2 * 10/2019 Tanaka ................... F16D 65/183
(Continued)

FOREIGN PATENT DOCUMENTS

DE 10 2005 051521 A1 6/2006
DE 10 2011 084534 A1 4/2012
(Continued)

OTHER PUBLICATIONS

Search Report for French application No. 1760528 dated Jun. 27, 2018.
(Continued)

*Primary Examiner* — Vishal R Sahni
(74) *Attorney, Agent, or Firm* — McDonald Hopkins LLC

(57) ABSTRACT
A control system for controlling an electric parking brake system of a motor vehicle having at least two brakes designed to be mounted near wheels of the motor vehicle, each brake comprising a parking brake actuator actuated by an electric motor; the control system comprises a control unit (UC) for controlling electric motors, such that, when an instruction to apply the parking brake is issued, the electric motors are supplied with power in order to actuate the actuator and allow application of the brakes. The control unit is designed to control the electric motors by pulse-width modulation at least in some of the actuation phases of the parking brake actuators.

4 Claims, 4 Drawing Sheets

(51) Int. Cl.
    *B60T 8/172*        (2006.01)
    *B60T 13/74*       (2006.01)

(56)          References Cited

U.S. PATENT DOCUMENTS

| | | | | |
|---|---|---|---|---|
| 2013/0282249 | A1* | 10/2013 | Heise | B60T 13/588 |
| | | | | 701/70 |
| 2016/0032993 | A1* | 2/2016 | Takei | F16D 65/18 |
| | | | | 188/162 |
| 2016/0032995 | A1* | 2/2016 | Nishino | F16D 55/226 |
| | | | | 188/72.3 |
| 2016/0244035 | A1* | 8/2016 | Yasui | B60T 13/741 |
| 2017/0028975 | A1 | 2/2017 | Suermann et al. | |
| 2018/0370512 | A1 | 12/2018 | Witte et al. | |
| 2019/0322265 | A1* | 10/2019 | Tsukamoto | B60T 17/221 |

FOREIGN PATENT DOCUMENTS

| | | | | |
|---|---|---|---|---|
| DE | 10 2016 213169 A1 | | 2/2017 | |
| JP | 2004278708 A | * | 10/2004 | |
| JP | 2015107746 A | | 6/2015 | |
| JP | 2016-032996 A | | 3/2016 | |
| JP | 2017-074809 A | | 4/2017 | |
| WO | WO-2015169417 A1 | * | 11/2015 | ........... B60T 15/027 |
| WO | WO-2016158569 A1 | * | 10/2016 | ............. B60T 13/74 |

OTHER PUBLICATIONS

International Search Report for PCT/FR2018/052773 dated Jun. 12, 2019.
International Preliminary Report on Patentability for PCT/FR2018/052773 dated Oct. 31, 2019.
Corresponding Japanese Patent Application No. JP2023-091445, Office Action dated Aug. 27, 2024.

* cited by examiner

SYSTEM FOR CONTROLLING AN ELECTRIC PARKING BRAKE BY PULSE WIDTH MODULATION

CROSS-REFERENCE TO RELATED APPLICATIONS

This is a National Stage application of PCT international application PCT/FR2018/052773, filed on Nov. 8, 2018, which claims the priority of French Patent Application No. 1760528, filed Nov. 9, 2017, both of which are incorporated herein by reference in their entirety.

TECHNICAL FIELD AND STATE OF PRIOR ART

The present invention relates to a system for controlling an electric parking brake system for an automobile vehicle, and a method for controlling an electric parking brake system.

In most current automobiles, the service brake is provided by disc brakes and/or drum brakes.

They provide the service braking function, aiming at slowing down, or even stopping, the automobile vehicle. The parking brake function aiming at halting a stationary vehicle and the emergency brake function are generally achieved with the system providing the parking brake.

Applying the parking brake can be achieved by pulling a lever disposed in the passenger compartment which is connected to a mechanism located in a drum brake or a disc brake, through a brake cable. The mechanism tends to pull the brake shoes of the drum brakes away from to apply them against the drums. In the case of a disc brake, the pads are applied on the brake disc.

To improve the driver's comfort and the security in applying the parking brake, the automotive industry has developed an electric parking brake.

Two types of systems exist. The first electric parking brake type includes an electric motor which pulls the cable, this system is called Cable Puller System. The second electric parking brake type includes an actuator provided with an electric motor at least on each rear brake, and causes the brakes to be applied.

The driver depresses for example a button disposed on the dashboard to activate electric parking braking.

The electric parking brake systems include direct current electric motors, the implementation of such motors being recommended for example by the German automotive industry association in its "VDA Recommendation".

The brake application speed, for example the application speed of the brake pads against the disc in the case of a disc brake, is made as a constant speed which is relatively fast. This is an all-or-nothing control. This all-or-nothing control is satisfactory in a normal operation of the parking brake, indeed when it is desired to activate the parking braking, the vehicle is most of the time stationary, the pads are applied against the disc at a constant speed.

However, in some situations, this all-or-nothing control can be damaging.

For example, upon changing a pad in the case of a disc brake, the brake is open at the maximum, i.e. the piston is moved backward at the maximum until it leans on abutments, the contact with these abutments making it possible to detect that the brake has reached his maximum opening position. However, the contact with the abutments can be abrupt.

In another example, to make certain tests or checks, the vehicle is mounted onto a roller bench which applies several drive torques to the vehicle wheels. The parking brake is thereby activated. It is required that the same increases the application torque as a function of the torque applied by the rollers. However, the case of a direct current motor ensures an all-or-nothing application of the parking brake, which causes the vehicle to be vibrated. These vibrations can result in skewing measurement results.

DISCLOSURE OF THE INVENTION

Consequently, a purpose of the present invention is to offer a system for controlling an electric parking brake system and a method for controlling an electric parking brake system enabling the abovementioned drawbacks to be reduced, or even solved.

The purpose of the present invention is achieved by a system for controlling an electric parking brake system including at least one direct current electric motor implementing a Pulse Width Modulation (PWM) control, in order to be able to adjust the motor speed and thus the speed of movement of the brake pads in the case of a disc brake or the brake linings in the case of a drum brake. The electric motors are then controlled, in some phases, by pulse width modulation, and in other phases at full power.

Thus, for example in the case of a pad change, the control system can contemplate a low speed backward movement for the piston. The contact with the abutments is made in a less abrupt manner. The damage risks are reduced. It can even be contemplated to reduce the size of the abutments which are no longer to be dimensioned to withstand an abrupt shock.

In the case of a test of the vehicle on a roller bench, the control system provides a slow increase in the application force which enables vibration occurrence to be limited.

The control system according to the invention can also control the brakes upon applying the parking brake in normal operation. For example, the control system is such that it ensures, during a first phase, a fast movement of the pads to the disc, and then in a second phase, a slower movement of the pads, which enables the required power to be reduced.

In other words, the electric parking brake is controlled so as to be able to have a variable actuation speed during an activation phase, regardless of whether, for example, it is in normal operation, during a brake maintenance and/or tests on the same.

The present invention is particularly advantageous in the case of an electric parking brake associated with a hydraulic service brake and even more advantageous, in the case of a braking system further including an Electronic Stability Program (ESP™) including a pressure generator.

In such a case, the PWM control enables the electric partial power possibly combined with the hydraulic power provided by the braking system to be adjusted, either due to depressing the brake pedal and/or due to the pressure generator of the ESP system.

Therefore, one subject-matter of the present invention is a system for controlling an electric parking brake system for an automobile vehicle including at least two brakes for being disposed at wheels of the automobile vehicle, each brake including a parking brake actuator for being activated by an electric motor, said control system including a control unit, said control unit including means for controlling the electric motors, such that when a control command to apply the parking brake is given, the electric motors are supplied to activate the actuators and enable brakes to be applied, said control means being configured for, in some activation phases of the parking brake actuators, controlling the electric motors by pulse width modulation, and in other activation phases of the parking brake actuators, controlling the electric motors at full power.

The control unit is advantageously able to receive external information informing it to control the electric motors by pulse width modulation.

For example, the control means include at least one power switching device, such as a power transistor or a triac.

Another subject-matter of the present invention is a braking system including a control system according to the invention and an electric parking brake system including at least two brakes for being disposed at wheels of the auto-mobile vehicle, each brake including a parking brake actua-tor for being activated by an electric motor.

The braking system preferably includes at least two service brakes.

Another subject-matter of the present invention is an automobile vehicle including a braking system according to the invention, the electric parking brake system acting on at least two of the four brakes. The control system is thereby configured to control the electric parking brake system during normal application of the electric parking brake.

Another subject-matter of the present invention is a method for controlling an electric parking brake system including a control unit and at least two brakes for being disposed at wheels of the automobile vehicle, each brake including a parking brake actuator activated by an electric motor, said method including at least:

a step of controlling the electric motors by pulse width modulation, when an activation of the electric parking brake system is considered as requiring a speed modu-lation of the electric motors, a step of controlling the electric motors at full power.

The PWM control step can occur before or after the control step at full power.

Further, the control steps can occur during the same braking action or during different braking actions.

In one exemplary embodiment, in the case where brake pads of a disc brake are changed, the electric motors are controlled, in a brake release direction, by pulse width modulation, such that their speed of rotation is lower than their speed of rotation during part of at least one activation phase of the parking brake in normal operation.

In another exemplary embodiment, in the case where the automobile vehicle is mounted onto a test bench, the electric motors are controlled by pulse width modulation, such that their speed of rotation continuously varies and the brake application force continuously varies.

In another exemplary embodiment, in the case where the automobile vehicle is mounted onto a test bench, the electric motors are controlled by pulse width modulation such that their speed of rotation varies stepwise, switching from one step to the other being gradual, and the brake application force continuously varies stepwise, switching from one step to the other being gradual.

The electric motors can be advantageously controlled by pulse width modulation, such that a normal activation phase of the electric parking brake system includes a first part at a first speed and a second part at a second speed, the second part corresponding to a compression phase of the brake linings, the second speed being lower than the first speed.

In another exemplary embodiment, during a phase of determining a position of at least one piston, the electric motors are controlled, in a brake release direction, by pulse width modulation, such that their speed of rotation is lower than their speed of rotation during part of at least one activation phase of the parking brake in normal operation.

BRIEF DESCRIPTION OF THE DRAWINGS

The present invention will be better understood based on the following description and the appended drawings in which.

DETAILED DISCLOSURE OF PARTICULAR EMBODIMENTS

Figure 1:
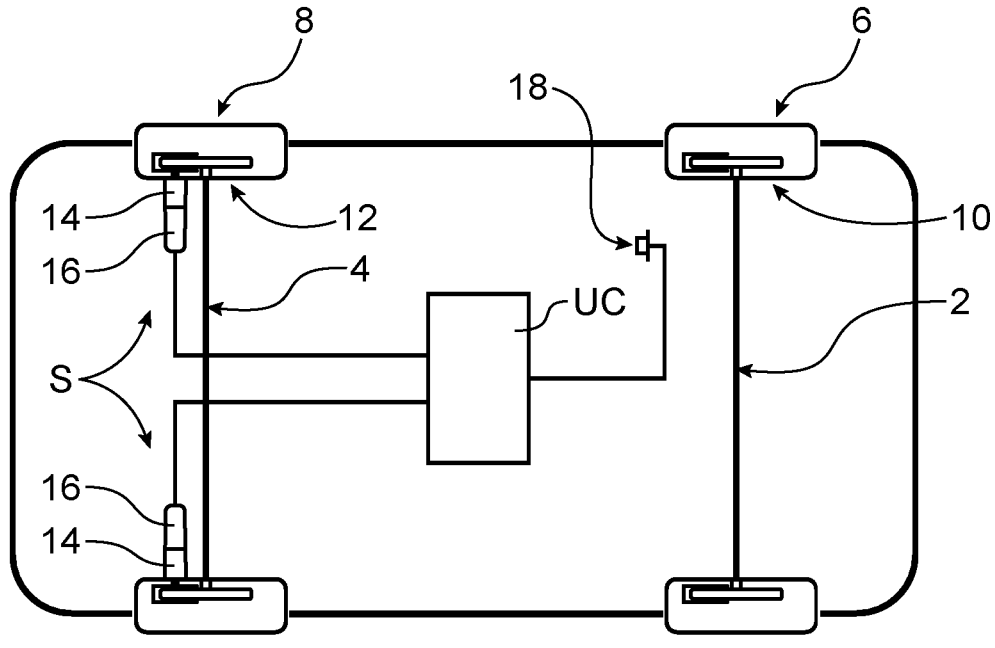
FIG. 1 is a schematic representation of an automobile vehicle, in a bottom view, including an electric parking brake system.

In the following description, the brakes of the electric parking brake system are disc brakes, but of course the implementation of drum brakes does not depart from the scope of the present invention. In FIG. 1, a schematic representation of an automobile vehicle equipped with an electric parking brake system S can be seen.

The automobile vehicle includes a front axle 2 and a rear axle 4, each equipped with two wheels 6, 8 respectively. Each wheel is equipped with a disc brake 10, 12 respec-tively.

The electric parking brake system S implements at least two brakes, in general the brakes 12 mounted at the rear wheels.

According to another example, the vehicle according to the invention includes four parking brakes.

The system also includes at each brake 12, an actuator 14 to apply the brake pads against the disc fixed to the wheel.

For example, the actuator 14 is driven by a direct current electric motor 16 via a reducer (not represented).

The disc brake for example includes a piston onto which a screw is mounted (not represented). The screw is rotatably driven by the electric motor causing the piston to be moved along the screw. The piston pushes on a pad which contacts the disc. As a reaction, the caliper slides applying the other pad onto the other face of the disc.

A system for controlling the electric parking brake system includes a control unit UC for controlling the application of the parking brake. Further, in the example represented, it includes a control member 18 disposed in the passenger compartment by means of which the driver can activate the electric parking brake. The control member is for example a button.

When the driver depresses the button for applying the parking brake, the signal is transmitted to the control unit which activates the actuator by supplying the electric motor, causing the brake pads to be moved to the disc.

The speed of movement of the pads is proportional to the current supplying the motor. This current is constant and is set by the circuit supplying the automobile vehicle.

According to the invention, the control unit includes means configured to make a Pulse Width Modulation control or PWM control of the electric motor 16.

The PWM control of the motor 16 enables the speed of rotation of the electric motor and thus the actuation speed of the brakes to be varied.

Figures 3, 4, 5:
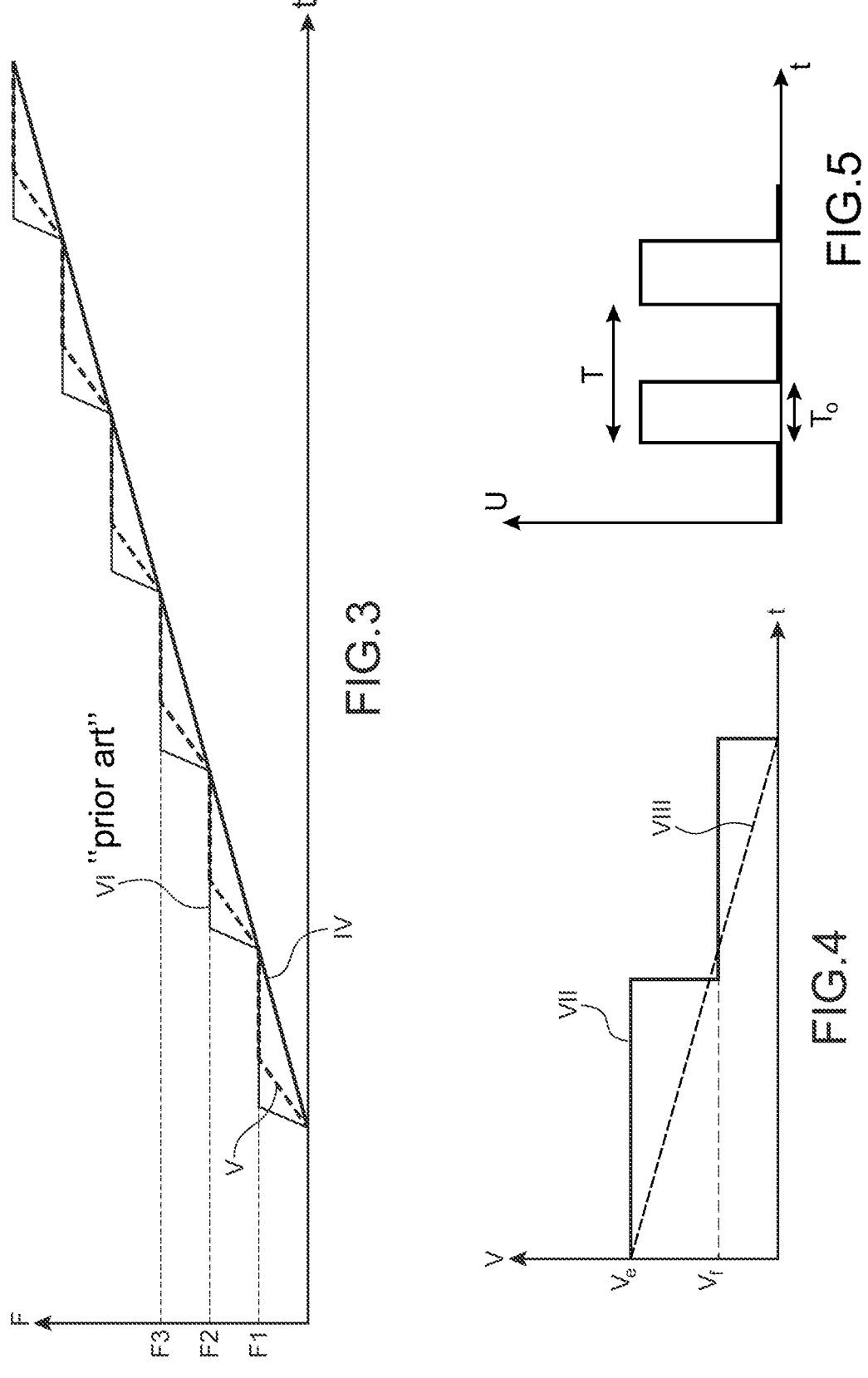
FIG. 3 is a graphic representation of an example of force variation applied as a function of the time in a brake of an electric parking brake system by means of a control system according to the invention and in a brake of an electric parking brake system of the state of the art.
FIG. 4 is a graphic representation of an example of speed variation of the actuator in a brake of an electric parking brake system by means of a control system according to the invention in the case of a normal application of the parking brake.
FIG. 5 is a graphic representation of an example of square wave voltage usable to supply the motor according to a PWM control.

The PWM control consists in supplying the electric motor with a square wave voltage. In FIG. 5, an example of square wave voltage U usable to supply the motor according to a PWM control can be seen. An average voltage which depends on the ratio of the square wave duration $T_0$ to the signal period T is thereby obtained. The speed of the motor will depend on the average voltage, by choosing the characteristics of the wave square signal, the speed of the motor can be varied.

The PWM control is for example implemented by a switching and/or power control device, such as at least one power transistor, for example an insulated-gate field effect transistor also called a MOSFET (Metal Oxide Semiconductor Field Effect Transistor), a triac.

According to a first example embodiment of the application, the PWM control of the motor 16 is implemented upon changing the pads. For example, it is indicated to the control unit that the replacement of the brake pads is desired.

When the brake pads have reached the wear level requiring change thereof, the motor is actuated so as to cause the piston to be moved away from the disc. The control unit detects that the brake is fully open, when it measures an abrupt increase in the motor supply current because of a contact between the piston and the abutment means carried by the brake.

According to the invention, when the control unit is informed that a pad change is required, it controls the motor movement with a PWM control, such that the backward movement of the piston of the disc brake is made at a slow speed with respect to the speed of the motor without a PWM control at least in the vicinity of the abutment, i.e. a backward position of the piston with respect to the disc.

Thus, the contact between the piston and the abutment means is not abrupt. The risks of damaging the brake are reduced. It can even be contemplated to reduce the size of the abutment means, reducing the brake mass.

Figure 2:
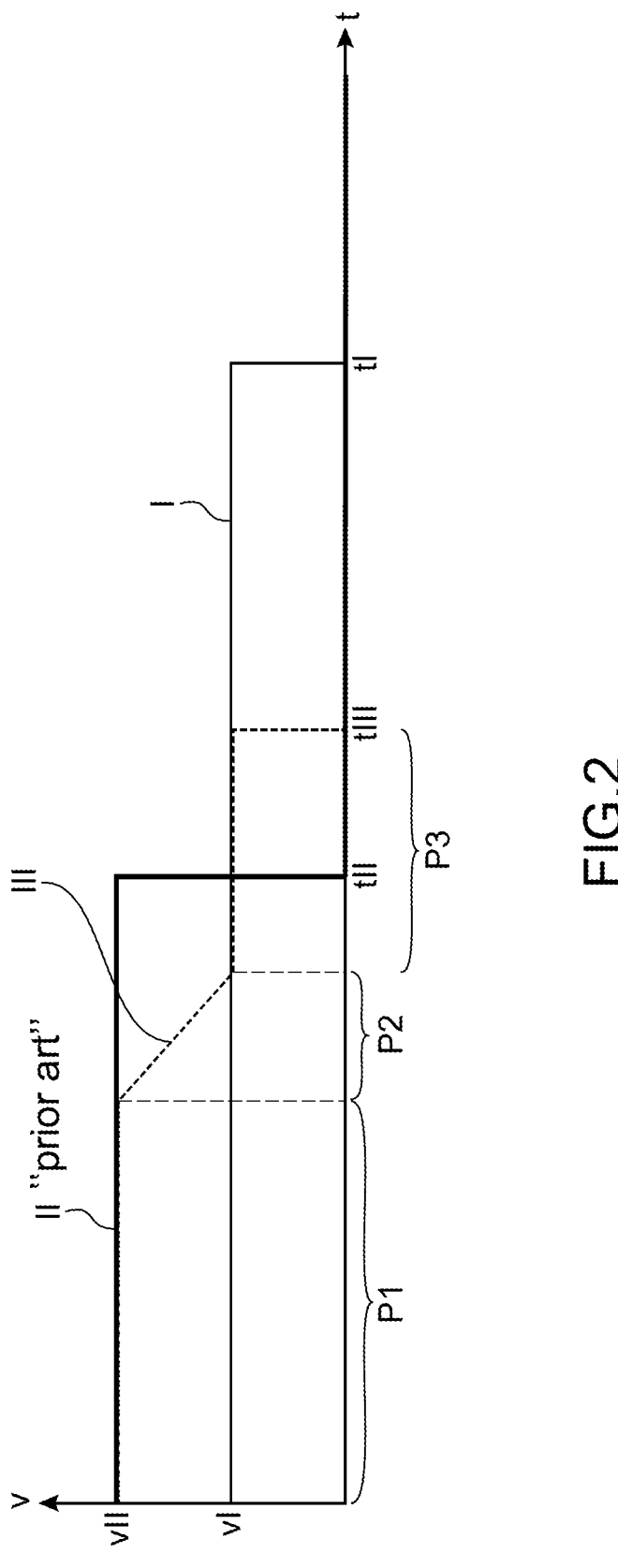
FIG. 2 is a graphic representation of an example of speed variation of the actuator in a brake of an electric parking brake system by means of a control system according to the invention, and in a brake of an electric parking brake system of the state of the art.

In FIG. 2, a schematic graphic representation of the speed v of movement of the actuator 14 can be seen in the brake opening direction as a function of the time t. Speed v is proportional to the speed of rotation of the motor 16. Curve I represents the speed of a system according to the invention, curve II represents the speed of a system of the state of the art.

Speed vII of curve II is higher and the opening time tII is shorter but the shock between the piston and the caliper is more abrupt, and thus more likely to deteriorate the brake.

Curve I shows a speed vI lower than vII and thus a longer opening time tI, but actually, the contact energy is lower. The damaging risks are substantially reduced.

According to one alternative, the PWM control can be such that the speed of the motor varies stepwise, more particularly decreases stepwise. In the example represented, in curve III, the speed is, in a first phase P1 equal to vII, and then in a second phase P2 continuously decreases according to a linear function to be equal to vI. At the end of a phase P3, the piston contacts the caliper at time tIII between tII and tI. Thus, the opening duration tIII is reduced with respect to that tI with a speed at the shock time equal to VI and a same energy dissipation.

The speed of forward or backward movement of the brake piston of a known type is for example equal to 1.2 mm/s.

The application of a PWM control according to the invention enables this speed to be decreased for example by a ratio between 1.1 and 100, preferably between 1.5 and 30, further preferably between 2 and 5, for example 2 or 3 or 4 times.

According to another exemplary embodiment, the PWM control of the motor is implemented when the vehicle is mounted onto a roller bench and the brakes are tested. The PWM control enables the braking force to be more gradually and more slowly varied. Indeed, the braking force depends on the brake closure, i.e. the position of the pads with respect to the disc. The manner in which the braking force varies over time depends on the manner in which the pads are moved and thus on the brake closing speed.

By finely controlling the variation in this speed, it is possible to more finely control the variation in the braking force, in comparison with the state of the art.

When the control unit is informed that the vehicle is mounted onto a roller bench, it applies a PWM control to the motor, in order to increase the braking force more slowly and more gradually. Thus, the uncontrolled motions/vibrations of the vehicle are reduced.

In FIG. 3, examples of variation in the braking force F as a function of the time t in the case of a braking system according to the invention (curves IV and V) and in the case of a braking system of the state of the art (curve VI) can be seen.

In view of the curve VI, the force varies stepwise F1, F2, F3 . . . with a nearly instant switching from one step to the other. The stepwise variation is pre-programmed. When the vehicle is on a roller bench, the brakes operate according to a specific program called a roller bench operation program. The activation of this program is obtained either manually by a control sequence, or by detecting the fact that the vehicle is mounted onto a roller bench which thereby has a particular dynamic behavior.

Curve IV also shows a stepwise increase in the speed. By means of the PWM control according to the invention, switching from one step to the other is gradually made, by varying the average supply voltage.

Curve V shows a gradual increase in the braking force achieved by means of the present invention.

Thus, the vehicle vibration causes are reduced, or even eliminated, which reduces the risks of skewing measurements.

In this example of application, the PWM control is such that during the steps, the average voltage is constant, and upon switching from one step to the other, the average voltage gradually increases.

The invention enables false rejections of a vehicle to be avoided due to a skewed measurement on the parking brake.

Indeed, the normal operation of a parking brake is generally a static operation, i.e. the wheels are halted and the brakes are applied.

However, to test the parking brake on a slope in a bench, the slope is dynamically simulated by rotating the wheels. However, if the electric motors are only controlled at full power, the braking system will detect wheel locking and will release braking. The parking brake will be thereby considered as failing.

By means of the invention, the motors are controlled during a braking phase in pulse width modulation, which allows a slow increase in the braking level. On the one hand, there is no risk of detecting wheel locking and braking release, and thus a false rejection of the vehicle; and on the other hand, the brake damaging risks are reduced.

According to another example embodiment of the application, the PWM control of the motor is used during a normal operation of the parking brake. By "normal operation of the parking brake", it is meant the expected operation when the driver wants to park his/her vehicle and halt it, and he/she activates the electric parking brake.

For example, the control unit controls the brake such that over a first part of the stroke, before the pads contact the disc, the piston is moved at a high speed, and such that over a second part of the stroke, upon compressing the pads against the brake, the piston is moved at a slower speed, which reduces the required power. The activation duration of the parking brake is slightly longer than in the case of a conventional system, but this duration is generally short, lengthening the activation phase is practically imperceptible to the user.

In FIG. 4, a schematic representation of this variation in speed V can be seen. Curve VII shows a movement at a high speed Ve, followed by a movement at a low speed Vf during which the pad compression occurs.

It will be understood that the speed can vary in more than two phases. Or even, during the compression phase, the speed can continuously decrease as is depicted by curve VIII.

According to one alternative, it can continuously decrease.

According to one example, the control unit applies a PWM control during the entire activation of the parking brake.

According to another example, phase A is made according to a conventional control and phase B according to a PWM control.

According to another example, the electric parking brake, in normal operation, can be controlled as an all-or-nothing control or with a PWM control depending on situations.

Figure 6:
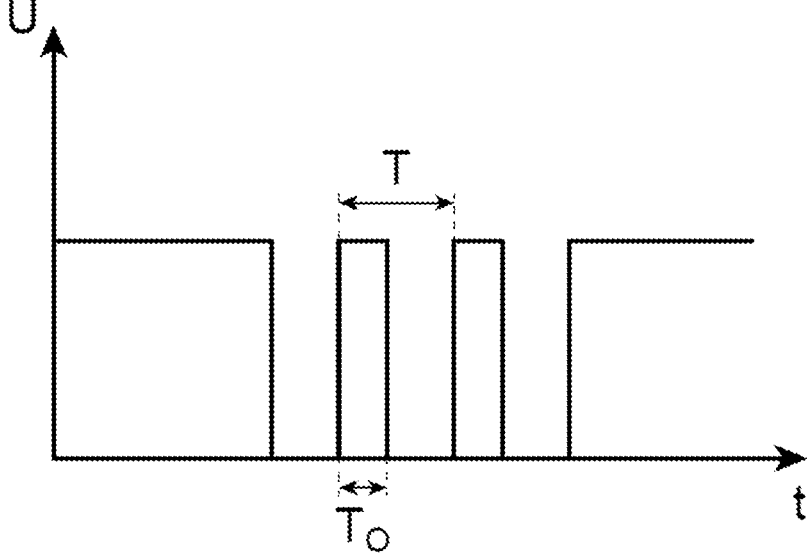
FIG. 6 is a graphic representation of an example of the PWM control step shown in FIG. 5 occurring before and after a full power control step.

Other situations can involve a single PWM control of the parking brake system or a combination of a PWM control and an all-or-nothing control (e.g., as schematically depicted in FIG. 6).

According to another example, the PWM control can be applied when the parking brake is used as an emergency brake. The emergency brake control is achieved by depressing the brake button when driving at a significant speed; for example for a speed higher than 5 km/h, the activation of the braking button activates the emergency brake, whereas for a speed null or lower than 5 km/h, the parking brake is applied.

The PWM control according to the invention can further be implemented outside the braking phases, whether in service, parking and/or emergency braking.

For example, each time the calculator needs to know the position of the disc brake piston, it moves the piston backward up to the rear abutment. This is for example made after a pad change, but can be periodically made by the calculator of the electronic stability program (ESP®). The PWM control is for example applied each time the calculator triggers a phase of determining the piston position. To determine the piston position, the latter is moved backward until it leans on the rear abutment, forming a reference position. From this reference position, the calculator can determine the following positions of the piston, for example by counting the number of revolutions of the electric motor of the actuator. By implementing the PWM control, the piston speed is reduced when coming closer to the rear abutment, which reduces damaging risks without disturbing the phase of determining the piston position.

Advantageously, the PWM control is applied to any operation type of brakes, being parking brake or emergency brake, during a braking phase and outside a braking phase.

The means for implementing the PWM control can be specific to the brakes to perform these controls and/or those already implemented elsewhere, for example those implemented in the calculator for controlling the braking modulation such as ESP® (Electronic Stability Program).

The invention is both applicable to the hydraulic service brake with a parking and/or electric emergency brake, as well as to the fully electric, i.e. service brake, parking and/or emergency brake, called EMB (Electromechanical Brake).

In one exemplary embodiment, the invention is applicable to an electric service brake with or without a parking brake. The electric motor is at least controlled in some activation phases of the electric motor by a pulse width modulation, for example to change brake pads or mark the piston position.

Further, the invention is applicable to disc brakes including one or more pistons, in which each piston is moved by its own actuator. The movement of each actuator can be controlled differently.

2—front axle
    4—rear axle
    6, 8—wheels
    10, 12—brakes
    14—actuator
    16—electric motor
    S—electric parking brake system
    UC—Control unit

What is claimed is:

1. A control method for controlling an electric brake system including a control unit and at least two brakes for being disposed at wheels of an automobile vehicle, each brake including a brake actuator activated by an electric motor, said method including at least:

a step of controlling the electric motors at full power during a first activation phase, a step of controlling the electric motors by pulse width modulation during a second activation phase when a speed modulation of the electric motors is required, wherein the first activation phase and the second activation phase occur during a same braking action including brake apply and brake release, wherein the first activation phase and the second activation phase occur during the brake apply, wherein the second activation phase occurs after the first activation phase, wherein the electric motors are controlled by pulse width modulation during the second activation phase corresponding to a compression phase of the brake linings, and wherein a speed of rotation of the electric motors during the second activation phase is lower than the speed of rotation of the electric motors during the first activation phase.

2. The control method according to claim 1, wherein the brakes are parking brakes.

3. A control method for controlling an electric brake system including a control unit and at least two brakes for being disposed at wheels of an automobile vehicle, each brake including a brake actuator activated by an electric motor, said method including at least:

a step of controlling the electric motors at full power during a first activation phase, a step of controlling the electric motors by pulse width modulation during a second activation phase when a speed modulation of the electric motors is required, wherein the first activation phase and the second activation phase occur during a same brake apply action, wherein the second activation phase occurs for determining a position of a piston during the brake apply action, and wherein a speed of rotation of the electric motors during the second activation phase is lower than the speed of rotation of the electric motors during the first activation phase.

4. The control method according to claim 3, wherein the brakes are parking brakes.

\* \* \* \* \*